United States Patent [19]

Saunders

[11] 3,792,637
[45] Feb. 19, 1974

[54] ROTARY DIE AND CUTTING RULE

[75] Inventor: Philip G. Saunders, Toledo, Ohio

[73] Assignee: Container Graphics Corporation, Toledo, Ohio

[22] Filed: June 7, 1972

[21] Appl. No.: 260,482

[52] U.S. Cl. .......................... 83/673, 83/55, 83/346
[51] Int. Cl. ......................... B26d 1/12, B23d 35/00
[58] Field of Search ....... 83/55, 331, 343, 344, 346, 83/347, 663, 669, 670, 673, 677

[56] References Cited
UNITED STATES PATENTS

| | | | |
|---|---|---|---|
| 937,331 | 10/1909 | Reed | 83/663 |
| 3,395,598 | 8/1968 | Martin | 83/663 |
| 2,270,639 | 1/1942 | Parks, Jr. | 83/677 |
| 3,554,070 | 1/1971 | Boyd | 83/347 X |

*Primary Examiner*—Willie G. Abercrombie
*Attorney, Agent, or Firm*—Allen D. Gutchess, Jr.

[57] ABSTRACT

An improved rotary die and steel cutting rule are provided. The die includes a die plate of precise, uniform thickness throughout its length and width, with the thickness of all die plates being consistent. The steel cutting rule for the die plate includes a metal strip having an upper cutting edge and a structurally-integral flange formed at substantially right angles to the cutting strip with the juncture of the flange and the strip being parallel to the upper cutting edge. The flange of the cutting rule is provided with suitable openings to receive fasteners by means of which the flange is fastened to the upper surface of the die plate. The cutting rule can be provided with a projection or projections on or adjacent the flange to penetrate the upper surface of the die plate to aid in holding the cutting rule in a predetermined position on the die plate.

7 Claims, 6 Drawing Figures

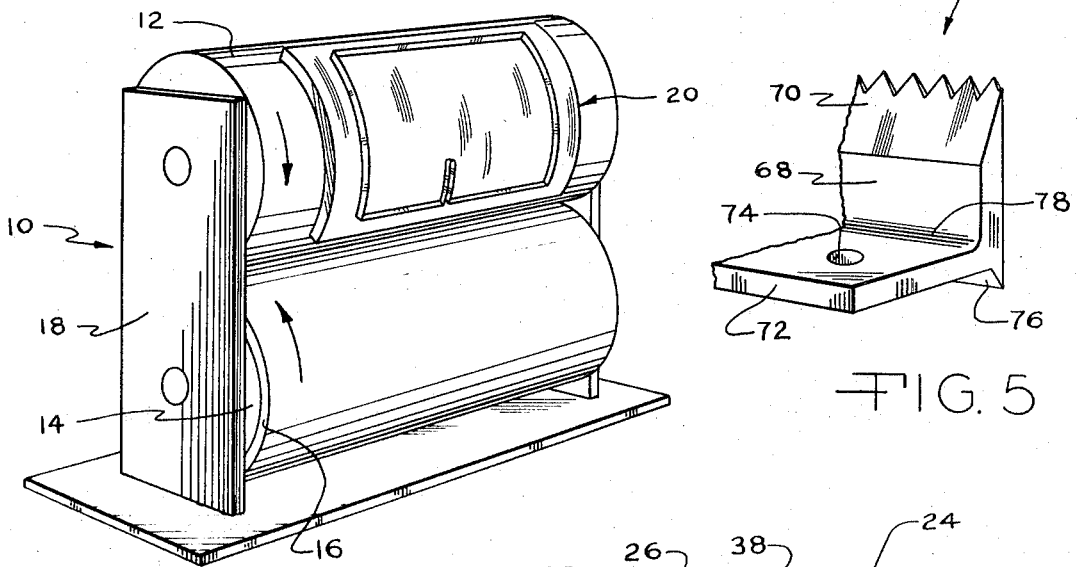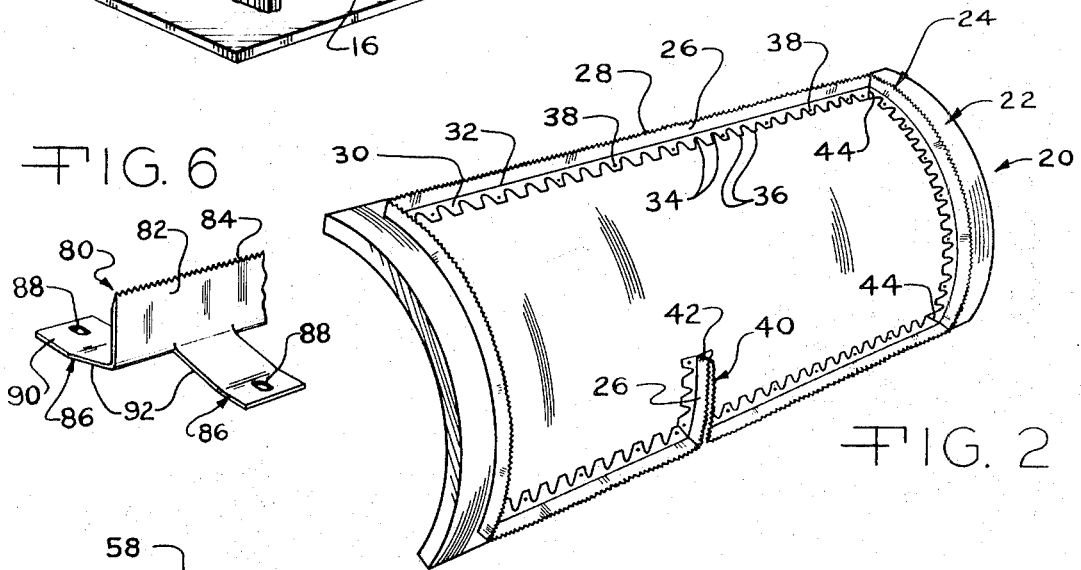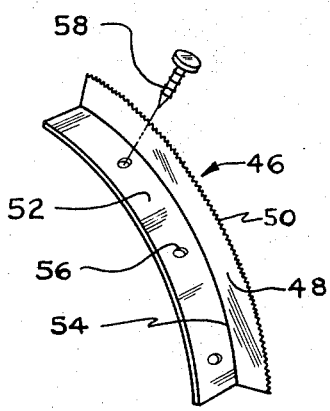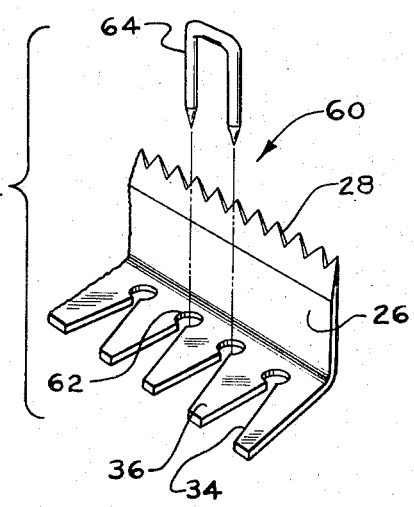

ROTARY DIE AND CUTTING RULE

This invention relates to a cutting die and particularly to rotary dies having cutting rules affixed to the surface thereof.

Dies of the type under consideration are employed to shape and cut sheet material, commonly corrugated board, into preformed blanks from which various types of containers, packages, etc., are subsequently made. Rotary dies are now being increasingly used over flat ones particularly because of the higher production rates achieved with the rotary dies. In the rotary die machine, a pair of cylinders are mounted in a supporting frame with a predetermined space therebetween. One of the cylinders carries a die plate having the desired cutting rules, perforating rules, and creasing rules mounted therein, in predetermined positions. The other cylinder has a yieldable pad or layer of plastic thereon which supports the corrugated board as it is fed between the cylinders during rotation of them.

To produce a blank of a predetermined shape for a particular application, the rotary die must be carefully fabricated with the various cutting, creasing, and perforating rules accurately positioned in the die plate. To achieve this, an arcuate die plate is first provided on which is laid out the appropriate shape of the desired blank, including lines for cuts, perforations, and folds. The layout for the die plate is accomplished with the aid of a special layout machine which compensates for the arcuate shape of the die plate to provide proper spacing between the cutting and other rules in spite of the arcuate configuration of the plate. Heretofore, saw cuts were made in the die plate along the particular layout lines to provide slots in the proper locations for receiving the cutting rules, perforating rules, and creasing rules. These slots had to be discontinuous in order to form bridges at intermediate portions of the slots which provided structural continuity between the various portions of the die plate. The rules then had to be notched at the appropriate locations to fit over these bridges and into the slots, with the lower edges of the rules seated against the die cylinder on which the die plate was mounted. This enabled the upper edges of the rules to always be at a fixed distance from the die cylinder even if the die plate itself varied in thickness, either from plate to plate or over the length or width of one plate.

Fabrication of dies in this manner was time consuming, particularly in producing the slots in the plate which not only had to be accurate but carefully made to provide the proper bridges. Further, any error in the positioning of the saw slots often meant that the die plate had to be scrapped. The proper positioning of the notches in the rules to match the die plate bridges also was time consuming. Additionally, the bridges in the die plate would sometimes break, due to being weakened when the cutting rules were forced into the slots or because the rules would bite into and weaken the bridges during operation. The breaking of the bridges would cause the rules to fly out of the cutting die, presenting a hazard. In some instances even the steel rule itself would break at the bridge and cause an overlap or other mis-matching of the rule at this location. In addition to this problem of the broken bridge or rule, at times when the rule was forced down against the metal cylinder on which the die plate was mounted, the effective length of the rule would change and result in a shaped or cut blank of incorrect dimensions.

In accordance with the invention, a rotary die is provided constituting a die plate of a uniform, predetermined thickness with cutting rules affixed to the surface thereof rather than being mounted in slots. With the cutting rules mounted on the surface, the saw cuts heretofore necessary are eliminated entirely, resulting in substantial savings in time and labor and reduced waste and improperly cut die plates. The problems of broken bridges and cutting rules broken at the bridges are also eliminated. Further there is no possibility that the effective length of the rules will be changed when mounted on the die plate slots.

The new cutting rule is preferably made from a single, elongate metal body having a metal strip with an upper cutting edge and a structurally-integral flange formed at the bottom of the cutting strip at substantially right angles thereto with the juncture of the flange and the strip being parallel to the upper cutting edge. The flange in one embodiment can be part of the metal strip bent out of the plane thereof to the right angle position with the strip then formed to the desired arcuate shape. Alternatively, the strip and flange can be extended in a generally right angular, cross-sectional shape. In either case the flange is at right angles to the cutting strip portion of the cutting rule and has suitable openings formed therein to receive fasteners for affixing the flange to the surface of the die plate. Further, if desired, the flange or portions of the cutting rule near the flange can be provided with downwardly-extending projections which penetrate or bite into the surface of the die plate to aid in holding the cutting rule in position thereon during operating.

It is, therefore, a principal object of the invention to provide an improved cutting die which can be made with less time and labor.

Another object of the invention is to provide a cutting die which can be made less expensively and with less waste.

Yet another object of the invention is to provide a cutting rule for a cutting die having a flange by means of which the cutting rule can be affixed to the surface of the die plate of the die.

A further object of the inventin is to provide an improved cutting rule having a cutting strip with an upper cutting edge and a flange extending at right angles to the cutting strip, which flange has means for affixing the cutting die to the upper surface of a die plate.

Yet a further object of the invention is to provide a cutting die in which the cutting rules are fastened to the die plate in a manner to reduce possible breakage of the rule or the die plate.

Many other objects and advantages of the invention will be apparent from the following detailed description of preferred embodiments thereof, reference being made to the accompanying drawings, in which:

FIG. 1 is a schematic view in perspective of a rotary die machine embodying the invention;

FIG. 2 is a somewhat enlarged view in perspective of a rotary steel rule cutting die shown in FIG. 1;

FIG. 3 is an enlarged view in perspective of a modified rotary cutting rule and a fastener for fastening the rule to a die plate in accordance with the invention;

FIG. 4 is an enlarged view of a further modified steel cutting rule and fastener embodying the invention; and FIGS. 5 and 6 are enlarged views in perspective of further modified cutting rules embodying the invention.

Referring particularly to FIG. 1, a rotary die machine is indicated at 10 and includes an upper die cylinder 12 and a lower, back-up cylinder 14. A resilient plastic layer 16 is mounted on the back-up cylinder 14 and the cylinders are rotatably mounted on a frame or stand 18 and can be adjusted by means (not shown) so that the space between them can be varied. In operation, the cylinders are rotated in the directions of the arrows by suitable drive means (not shown). Corrugated board or other suitable sheet material is fed between the cylinders 12 and 14 where it is engaged by a rotary cutting die 20 and shaped and formed into a blank from which containers or other products can be formed or fabricated.

A rotary cutting die 20 (FIG. 2) basically includes a die plate or board 22 from which steel cutting rules 24 project. Other types of rules such as creasing rules and perforating rules are not shown in this instance. The die plate 22 is of a predetermined thickness with that thickness being constant throughout its length and width. When the die plate is made of high quality plywood, and formed to the arcuate shape as shown, the actual thickness may vary slightly from board to board and also over the area of an individual board. The board can be made of a predetermined and uniform thickness, however, by suitably finishing the surface such as by mounting the board on a cylinder on a lathe, and machining and sanding the surface to achieve the proper thickness. If the board is made of plastic material, such as shown in a copending application of J. R. Simpson, Ser. No. 213,016, the desired dimensions usually can be achieved when the board is made without further machining or other steps being necessary.

With the die plate having a predetermined, uniform thickness, it is possible to lay out directly on the surface thereof the lines by means of which the cutting rule are to be positioned. The layout can be directly on the die plate surface since the dimensional changes required to compensate for the radius of curvature of the die plate can be readily determined and a scale set accordingly. Consequently, no expensive layout machine is needed, as required with the usual die plates varying in thickness. With the layout lines on the surface, the cutting rule 24 according to the invention can be positioned thereon and affixed to the die plate 22 without saw cuts being required at all. The saw cuts, bridges, and special notches in the steel cutting rules needed to fit over the bridges are thereby eliminated, along with the time and labor required for same.

Since the saw cuts are eliminated, there is also greater freedom in the placement of the cutting rules 24. For example, as shown, the cutting rules can be placed closer to the edges of the die plate 22. This reduces the size requirements for the die plates in some instances and results in further saving in material.

Each of the cutting rules 24, as shown in FIG. 2, comprises an elogate steel cutting strip or portion 26 having a serrated cutting edge 28 formed at the upper edge thereof. A flange or transversely extending portion 30 is structurally integral with the strip 26 and formed at substantially right angles thereto. The juncture of the flange 30 and the strip 26, indicated at 32, is parallel to the cutting edge 28. In this instance, the flange 30 has notches 34 forming tabs 36 with certain ones of the tabs 36 having openings (not shown) to receive fasteners 38. For the cutting rules extending circumferentially or having a circumferential component of direction, the arcuate shape thereof can be formed by passing the cutting rule through a three-roll bender to establish the desired arcuate shape, as is generally known in the art. The cutting rules 24 can be made in three shapes: straight, with a full arc when extending circumferentially, or with a shallower arc when extending at a 45° angle relative to the axis of the die cylinders.

When the cutting rule is to be used to form a slot or elongate notch in the corrugated board blank, a cutting rule indicated at 40 can be employed. This cutting rule is similar to the other rules 24 but the strip portion 26 is bent back on itself at 42 to provide the desired U-shaped configuration. The notch 34 at the bend 42 can be cut slightly deeper, extending to the juncture 32, to provide the proper bend for the strip 26. At the corners, the flange 30 can be notched on a diagonal, generally as indicated at 44 to provide the proper junction.

Referring to FIG. 3, a slightly modified cutting rule is indicated at 46. This cutting rule again has a cutting portion or strip 48 with an upper cutting edge 50 and a flange or transversely extending portion 52 extending outwardly at right angles from a juncture 54, the flange 52 in this instance being solid. Suitable openings 56 are punched or otherwise formed in the flange 52 to receive serrated fasteners 58, by way of example.

A modified cutting rule 60 in FIG. 4 is similar to the cutting rule 24 except that it has openings or holes 62 formed at the ends of the notches 34. In this instance, staples 64 are designed to fit into pairs of the openings 62 to affix the cutting rule 60, to the die plate surface. These are sized to extend through the holes 62 in a manner to prevent any lateral movement of the cutting rule 60.

A modified cutting rule 66 is shown in FIG. 5, the rule 66 being extruded, in this instance. The rule 66 includes a cutting portion or strip 68 having a cutting edge 70 and a transversely extending portion or flange 72 extending at right angles thereto, with openings 74 for receiving fasteners. The cutting rule 66 has a projecting ridge 76 at the juncture 78 of the flange and cutting strip. This projection is designed to bite into the surface of the cutting die plate and to aid in holding the cutting rule in position.

Referring to FIG. 6, a further modified cutting rule 80 is shown, being made of steel. This rule 80 includes a cutting strip or portion 82 having an upper cutting edge 84. Flanges or transversely extending portions 86 are bent outwardly in both directions substantially at right angles to the strip 82 with elongate openings 88 therein to receive fasteners, such as the fasteners 58 of FIG. 3. The flanges 86 in this instance include outer portions 90 which are in direct contact with the die plate surface, these portions lying in a common plane, and inner portions 92 which extend upwardly from the die plate at slight angles thereto. This configuration of the flanges 86 provides a somewhat yieldable mounting to enable the cutting strip 82 to give somewhat to make up for wear and slight variations in the distance from the cutting edge 84 to the surface of the die plate 22. With the holes 88 being elongate, the outer flange portions 90 can move slightly with respect to the fasteners to enable the yieldability to occur.

Various modifications of the above-described embodiments of the invention will be apparent to those skilled in the art and it is to be understood that such modifications can be made without departing from the scope of the invention, if they are within the spirit and the tenor of the accompanying claims.

I claim:

1. A die assembly comprising a die plate having a predetermined, uniform thickness, a cutting rule comprising a metal cutting portion having an upper cutting edge and a structurally-integral, transversely-extending portion extending substantially outwardly therefrom, said cutting rule having a downwardly-extending projection which penetrates the surface of said die plate when said cutting rule is affixed thereto, said transverse portion having fastener openers therein, and fasteners extending through said openings and affixing said cutting rule to the surface of said die plate.

2. An arcuate cutting rule comprising an elongate, formed metal body comprising an arcuate metal strip having an upper arcuate cutting edge and a structurally-integral flange at substantially right angles to said strip, the juncture of said flange and said strip being parallel to the upper cutting edge, said cutting rule having means for affixing said rule to a die plate, and said cutting rule having a projection extending downwardly perpendicularly generally away from said flange and adapted to penetrate the surface of the die plate to which the cutting rule is to be affixed.

3. A cutting rule according to claim 2 characterized by said affixing means comprising openings in said structurally integral flange.

4. An arcuate cutting rule according to claim 2 characterized by said strip and said flange being of extruded metal.

5. A die assembly comprising a die plate having a predetermined, uniform thickness, a cutting rule comprising a metal cutting portion having an upper cutting edge and a structurally-integral, transversely extending portion extending substantially outwardly therefrom, said transverse portion having a plurality of spaced, generally V-shaped notches formed therein, fastener openings formed at the ends of said notches, and fasteners extending through said openings and affixing said cutting rules to the surface of said die plate.

6. An arcuate cutting rule comprising an elongate, formed metal body comprising an arcuate metal strip having an arcuate cutting edge and a structurally integral flange extending at substantially right angles to said strip, the juncture of said flange and said strip being parallel to the upper cutting edge, said flange having portions extending in opposite directions from the plane of the metal strip, said flange having outer portions and inner portions, the latter extending upwardly at slight angles to the outer portions, said outer portions having fastener openings therein.

7. An arcuate cutting rule according to claim 6 characterized by said fastener openings being elongate in said outer portions with their longitudinal extent being substantially perpendicular to the plane of said metal strip.

* * * * *